United States Patent [19]

Kondo et al.

[11] 4,423,307
[45] Dec. 27, 1983

[54] CONTROL SYSTEM FOR ELECTRIC AUTOMOBILE HEATING APPARATUS

[75] Inventors: Yasuo Kondo, Okazaki; Masanori Kato, Kariya; Mitsuru Nakagawa, Chiryu, all of Japan

[73] Assignee: Nippon Soken, Inc., Nishio, Japan

[21] Appl. No.: 257,118

[22] Filed: Apr. 24, 1981

[30] Foreign Application Priority Data

Apr. 29, 1980 [JP] Japan ................. 55-56767

[51] Int. Cl.$^3$ .................. H05B 1/02; B60H 1/02; H02P 9/04
[52] U.S. Cl. .................. 219/202; 123/142.5 E; 219/279; 290/2; 290/40 B; 290/40 C; 307/9
[58] Field of Search .................. 219/202, 279; 123/142.5 R, 142.5 E; 290/1 A, 2, 40 R, 40 B, 40 C; 307/9, 10 R

[56] References Cited

U.S. PATENT DOCUMENTS

| | | | |
|---|---|---|---|
| 3,264,450 | 8/1966 | Wallace | 219/202 X |
| 3,469,073 | 9/1969 | Zechin | 219/202 X |
| 3,525,853 | 8/1970 | Nilssen | 219/279 X |
| 3,868,559 | 2/1975 | Hill et al. | 219/202 X |
| 4,188,527 | 2/1980 | Follmer | 219/202 |

*Primary Examiner*—A. Bartis
*Attorney, Agent, or Firm*—Cushman, Darby & Cushman

[57] ABSTRACT

An electric heating apparatus for heating the passenger compartment of a motor vehicle, such as an automobile, having an internal combustion engine driving an electric power generator for charging a battery supplying power to electrical equipment on the vehicle includes a control system permitting actuation of the apparatus only when the engine reaches a predetermined rotational speed above which the generator is able to generate power. The air-fuel mixture supplied to the engine is regulated by a rotational speed control means in accordance with a control signal produced by a control circuit responsive to a temperature sensor detecting that the engine temperature is below a predetermined level and a voltage sensor detecting that the voltage produced at the neutral terminal of the power generator is higher than a predetermined value to increase the rotational speed of the engine and thereby the power generated by the power generator. A power supply switch responsive to the control signal is energized to cause power to be supplied to the electric heating element of a warm air generator for supplying heat to the passenger compartment until such time as the engine temperature rises above the predetermined level, the detected voltage drops below the predetermined value or the system is manually turned off by operation of the ignition switch or a system operating switch. The control system prevents over-discharge of the vehicle battery.

2 Claims, 2 Drawing Figures

CONTROL SYSTEM FOR ELECTRIC AUTOMOBILE HEATING APPARATUS

BACKGROUND OF THE INVENTION

The present invention relates to a heating apparatus for automobiles, or more in particular to an electric heating apparatus for automobiles, using automobile electric power supplies in such a manner that a comfortable heating effect is attained at low temperatures of the engine cooling liquid immediately after starting the automobile engine.

A construction of a heating apparatus is known in which an electric heat generating member is arranged in a ventilation circuit of a hot-water type heating apparatus using the engine cooling liquid as a heat source thereby to supply hot air into the automobile passenger space until the engine cooling liquid is heated to such a degree that the air temperature reaches a predetermined value. In particular, the heat generating member comprises an element of semiconductor ceramics having a positive temperature coefficient of resistance (PTC) characteristic so that when the temperature of the air flowing in from the hot water type heating apparatus and circulating in the ventilation circuit increases to a predetermined value, the heat source is switched automatically from the heat generating member to the hot-water type heating apparatus by the self-control of the temperature of the heat generating member. In other words, the prior art relates to the function of the heat generating member itself.

In the above-mentioned construction of the conventional heating apparatuses, it is possible to start heating as soon as the engine starts. In actual applications, however, practically comfortable heating requires an amount of heat from the heat generating member which meets the thermal capacity of the whole of the automobile cabin. Thus an additional electric power consumption is required from the electric power supply, and therefore it is necessary to provide a power supply capacity for achieving the object of the prior art when the heat generating member is operated. The amount of the power required for the comfortable heating, on the other hand, is very great as compared with the power supply capacity, thus making it inevitably necessary to increase the capacity of heat generation as much as possible.

Such a consideration is overlooked in the construction of the conventional heating apparatuses. Specifically, the prior art constructions are such that the user is always afraid of a decreased capacity of the battery and an inability to restart the engine at the sacrifice of the heating capacity. Further, the over-discharge of the battery shortens the service life thereof, thus reducing the function thereof as a power supply for other equipment. Furthermore, in spite of the fact that the heat generating member utilizes the Curie point of a positive resistance temperature element and therefore it is possible to switch the heat source to the engine cooling liquid automatically, the Curie point is required to be as low as 75° to 85° C., with the result that the heat exchange ability requires an increased effective area of the heat generating member, thus making the apparatus inconveniently bulky for practical purposes.

SUMMARY OF THE INVENTION

Accordingly, it is an object of the present invention to provide an electric heating apparatus which can be efficiently operated in harmony with the operation of the other automobile equipment on the one hand and which has the advantages of both the comfort and economy on the other hand.

According to the present invention, there is provided an electric heating apparatus for automobile which is not actuated at low engine rotational speed, such as at the time of start, but is actuated at the time point when the engine reaches a predetermined rotational speed above which the power generator is enabled to generate electric power. As soon as the heating apparatus is actuated, the amount of engine intake air or the throttle opening is regulated to increase the rotational speed of the power generator and the amount of power generated by the power generator driven by the engine, so that the current of the generator is supplied mainly to the heat generating member for heating purpose. At the same time, the terminal voltage of the battery is detected, and when the terminal voltage is reduced below a predetermined level or the temperature of the engine cooling liquid reaches a predetermined value, the operation of the heat generating member is stopped. These functions are automatically performed without adversely affecting the existing functions of the automobile, thereby securing both the amount of power required of the auxiliary electric heating apparatus and comfortable heating. In the case where a positive temperature coefficient element is used as a heat generating member, the Curie point thereof can be set to a level higher than the temperature of the engine cooling liquid, thus making it possible to provide a compact and highly safe electric heating apparatus high in heat generating capability. Further, the electric transient heating and and heating using the engine cooling liquid as a heat source are used in complementary relation to each other, thereby realizing both the comfort and economy at the same time.

DESCRIPTION OF THE PREFERRED EMBODIMENTS

The present invention will be described below with reference to the embodiment illustrated in the accompanying drawings.

Figure 1:
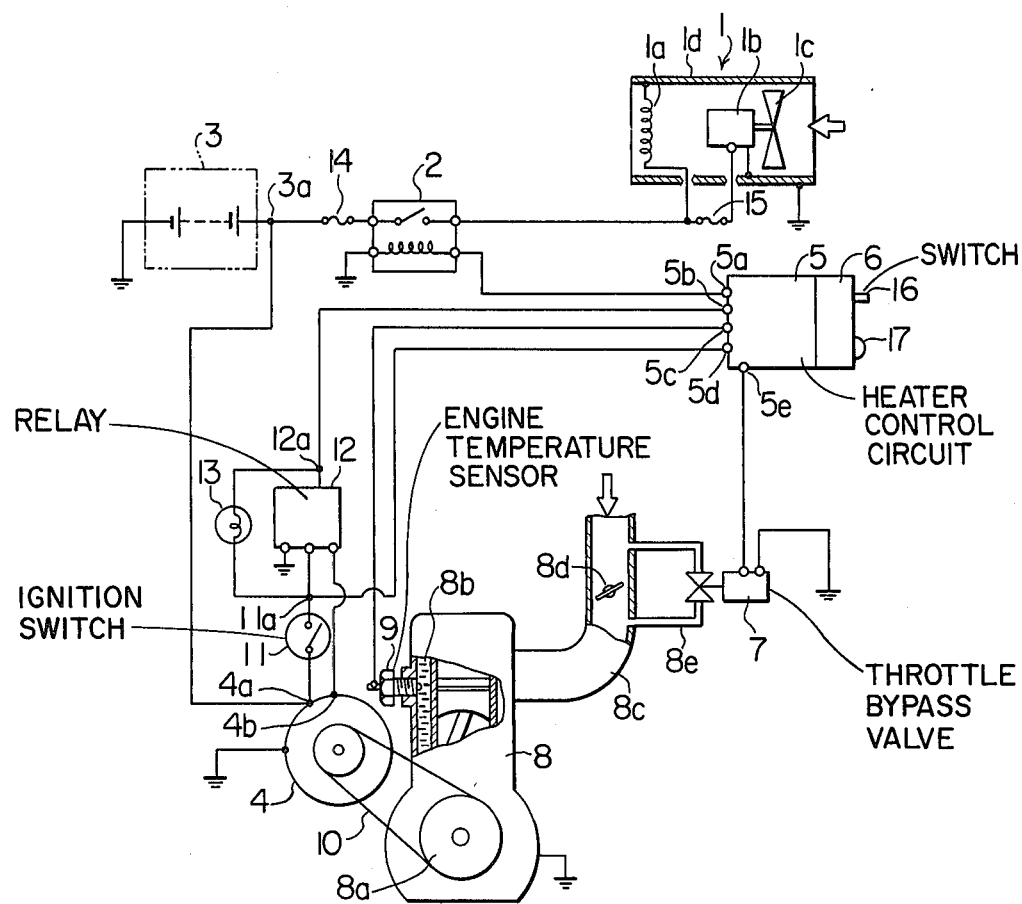
FIG. 1 is a diagram showing a general configuration of an embodiment of the present invention.

FIG. 1, a hot air generator 1 comprises a heat generating member 1a downstream in a case 1d, and a fan 1c driven by a motor 1b, which fan is arranged upstream in the case 1d, thus making up a ventilation circuit for heating the automobile cabin. A power supply section including a battery 3 and a power generator 4 for the automobile is connected in parallel with the hot air generator 1 for supplying power to the latter in operation. The generator 4 in operation mainly supplies power to the hot air generator 1 and charges the battery 3 from time to time.

The heat generating member 1a and the motor 1b are connected in parallel to each other, and through a fan fuse 15, an interruption relay 2 and a main fuse 14, connected to the output terminal 4a of the generator 4 and the terminal 3a of the battery 3. The generator 4, on the other hand, is run to generate power by being driven by a crank pulley 8a of the engine 8 through a belt 10.

The engine 8 has a temperature sensor 9 mounted thereon for detecting the temperature of the cooling liquid 8b. An intake air bypass 8e is arranged through a solenoid valve between upstream and downstream of an intake air throttle valve 8d of an intake manifold 8c. The air flow in this bypass is adapted to be interrupted to change the amount of intake air of the engine 8.

The input-output terminal 3a of the battery 3, the output terminal 4a of the generator 4 and the terminal 11a of the ignition switch 11 of the engine are connected in series. The terminal 11a is connected to the input terminal 12c of a charge relay 12 on the one hand and to the input terminal 5d of the control circuit 5 on the other hand, thus supplying drive power to the control circuit 5. The output terminal 12a is connected to the input terminal 5b of the control circuit 5 so that the charge signal or the terminal voltage signal of the battery 3 is applied to the terminal 5b in accordance with the opening or closing of the charge relay 12. The neutral terminal 4b of the generator 4 is connected to the terminal 12b of the charge relay 12 thereby to supply a neutral point voltage which increases with the power which in turn is increasingly generated by an increased rotational speed of the generator 4. Between the terminals 11a and 12a, the charge lamp 13 is connected in parallel with the charge relay 12. When the generator 4 starts to generate power, the charge relay 12 closes so that the charge lamp 13 is extinguished while at the same time supplying the input terminal 5b of the control circuit 5 with the terminal voltage of the battery 3.

The temperature sensor 9 is interposed between the terminal 5c of the control circuit 5 and the grounding terminal. When the temperature of the cooling liquid 8b reaches a predetermined value, the temperature sensor 9 opens thereby to cut off power supply to the control circuit 5 and stop the operation thereof.

The operating section 6 is comprised of an operating switch 16 and a display lamp 17. An operation signal from the operating section 6 is applied to the control circuit 5, so that the display lamp 17 is lit only when the control circuit 5 is in operation.

The output terminal 5a of the control circuit 5 is connected to the interruption relay 2 and the output terminal 5e thereof is connected to the solenoid valve 7 thereby to produce an output thereof to the relay 2 and the solenoid valve 7 respectively as a result of comparison between the respective input signals and a set value.

Figure 2:
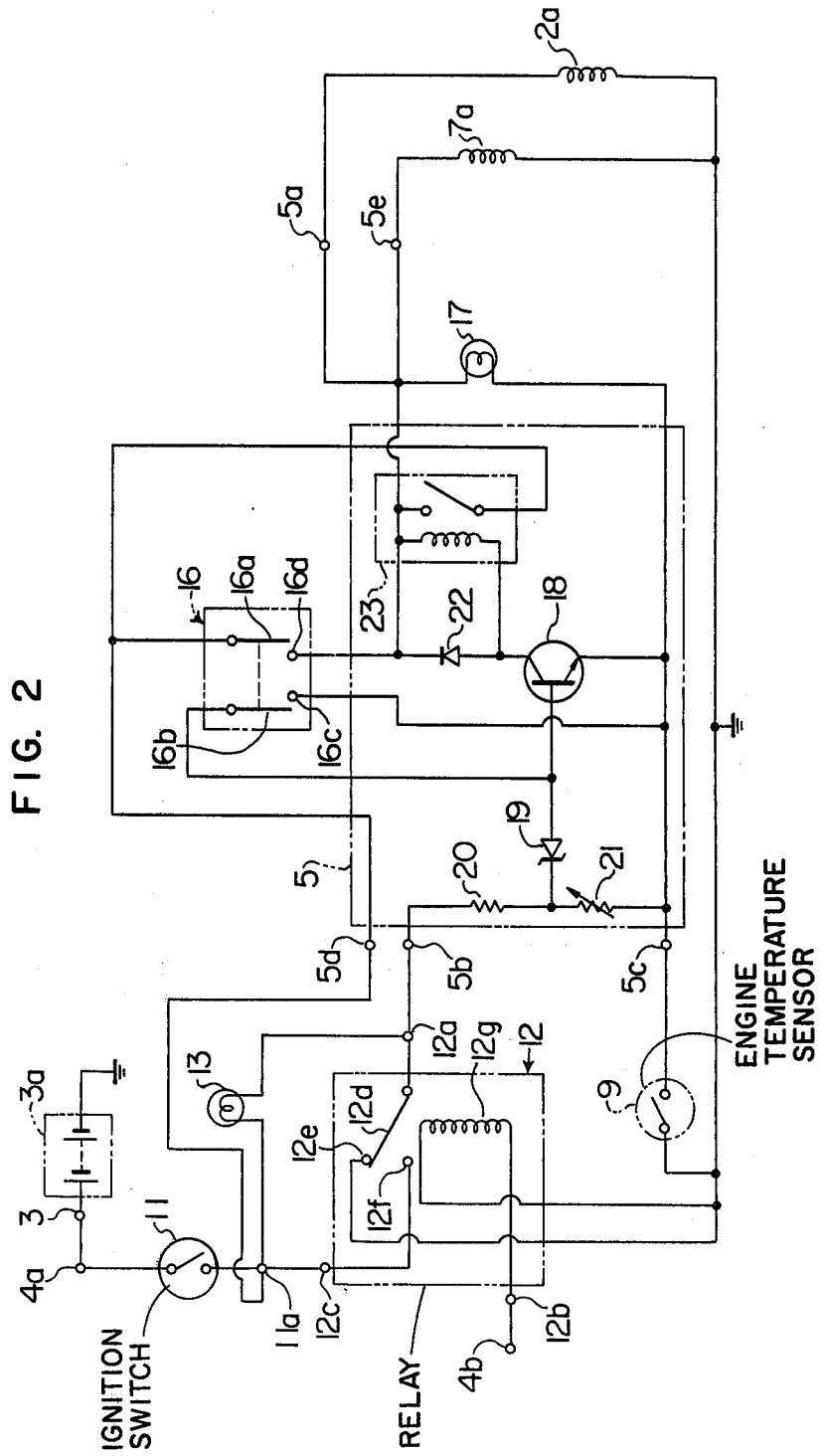
FIG. 2 is a diagram showing a detailed electric circuit of the essential parts of the embodiment of FIG. 1.

In the electric circuit diagram of FIG. 2 the well-known charge relay 12 is supplied with power at the voltage coil 12g therof through the input terminal 12b from the neutral terminal 4b of the generator 4, and is adapted to attract and close the movable contact 12d at or above a predetermined voltage.

The operating switch 16 is of a double-throw momentary type and works in such a manner that an operation command signal is generated when the movable contact 16a and the fixed contact 16d are closed, and an operation stop command signal is generated when the movable contact 16b and the fixed contact 16c are closed. Normally, these contacts are opened.

The control circuit 5 in operation causes resistors 20 and 21 to divide the voltage value applied to the terminal 5b, and decides whether the voltage value is higher than a set value or not on the basis of whether the voltage-regulation diode 19 conducts or not. When the voltage value is reduced, the input to the transistor 18 (only one transistor is shown in the drawing, which transistor may be replaced by a switching circuit such as the Schmit circuit) is cut off thereby to open the interruption relay 23. When the input voltage at the terminal 5b is higher than the set value, on the other hand, the interruption relay 23 is closed. In this way, power is supplied via the output terminals 5a and 5b to the coil 2a of the interruption relay 2 and the coil 7a of the solenoid valve 7, thus turning on and off these devices.

The operation of a circuit having the aforementioned construction will be described. When the engine key switch 11 is closed, the circuit drive power is supplied to the control circuit 5. Under the condition where the engine is not started, that is, when the generator 4 has not yet started to generate power, even if when an operation command is applied to the operating switch 16, the voltage at the terminal 5b is reduced below the set value so that the interruption relay 23 in the control circuit 5 is open and therefore the solenoid valve 2 and the interruption relay 7 fail to operate in view of the fact that the charge relay 12 is open. Also, even though the temperature of the cooling liquid of the engine 8 is lower than the set value and the temperature sensor 9 is actuated, the interruption relay 7 and the solenoid valve 2 fail to operate, thus preventing the hot air generator 1 from being actuated.

When the engine 8 starts under the above-mentioned condition, on the other hand, the power generator 4 begins to generate power and accordingly a voltage is generated at the neutral terminal 4b, thus closing the charge relay 12. As a result, the terminal 5b of the control circuit 5 is supplied with the terminal voltage of the battery 3. This is equivalent to the fact that it has been decided that the generator 4 is generating power normally. When the terminal voltage of the battery 3 is increased over the set value and the temperature sensor 9 is turned on, namely, a temperature below the set value is involved, application of an operation command to the operating switch 16 causes the interruption relay 2 to be closed thereby to actuate the hot air generator 1. At the same time, the solenoid valve 7 opens and the intake air bypass 8e of the engine 8 opens, so that the engine 8 is accelerated to a rotational speed commensurate with the amount of power generated by the generator 4. In this way, the power generated by the generator 4 is supplied to the heat generating member 1a. The battery 3 acts as an auxiliary power supply when required.

In the event that the battery 3 over-discharges and decreases to the critical value of the set voltage during the aforementioned operation for some reason or other, or in the event that the temperature of the cooling liquid 8b of the engine 8 reaches a set value where the hot water heater is operable, or in the event that the engine key switch is opened, or in the event that the operating switch 16 receives an operation stop command, then the interruption relay 23 in the control section 5 opens, so that the operation stops automatically while at the same time reducing the engine speed to normal level, with the result that the power generator 4 and the battery 3 maintain the power supply functions thereof.

In the case where the hot air generator 1 has a required heating ability of 600 watts, for instance, the current consumption is 50 A (the source voltage being 12 V). In the conventional constructions, the amount of discharge by the battery is 30 to 35 A, and therefore consumption for about 5 to 10 minutes causes an over-discharge. If the heating ability is reduced to avoid this inconvenience, it is difficult to achieve a comfortable heating. According to the construction of the embodiment under consideration, by contrast, the conventional constructions are partially utilized and controlled, with the result that the over-discharge of the battery is prevented on the one hand and the comfortable heating and the conventional automobile power supply functions are secured on the other hand.

In the embodiment shown in the drawings, any of the modifications described below may be accomplished with equal effect.

(1) The functions of increasing the idling r.p.m., deciding whether or not the hot air generator is to be actuated by detecting the battery capacity from the terminal voltage thereof, deciding whether or not the hot air generator is to be actuated by detecting the temperature of the engine cooling liquid, and deciding whether or not the hot air generator is to be actuated by detecting the power generating ability of the generator, may be performed either individually or in appropriate combination as required. Further, the function of increasing the idling r.p.m may double as other functions.

(2) The terminal voltage of the battery may be detected directly from the terminals thereof so that the hot air generator may be operated regardless of the operation of the engine key switch.

(3) The capacity of the battery may be detected in terms of the specific gravity of the battery solution instead of the terminal voltage thereof.

(4) The temperature sensor 9 of the engine cooling liquid may be located at the outlet or inlet of the hot water of the heat exchanger of the hot-water type heater. Also, the temperature sensor 9 may double as an existing temperature sensor.

(5) In the case where the operation of the electric hot air generator is required even when the engine cooling liquid increases in temperature and the hot water type heater is operable, the functions of cancelling the operation stop due to the temperature increase of the engine cooling liquid and switching the operation may be added to the control circuit 5 and the operating circuit 6, in order to make possible selective operation of the hot air generator.

(6) The control circuit 5 and the operating section 6 may be integrally formed. These elements may further be integrated with the hot air generator 1.

(7) The operating section 6 may be operatively interlocked with the operating switch of the hot-water type heater.

(8) In the case where the engine cooling liquid increases in temperature and the hot-water type heater becomes operable during the operation of the hot air generator 1, either the operation of the hot air generator 1 may be automatically switched to the operation of the hot-water type heater or both the hot air generator 1 and the hot water type heater may be operated.

(9) The blower circuit for the hot air generator 1 may double as that for the conventional hot-water type heater.

It will be understood from the foregoing description that according to the present invention the operation of the electric heating apparatus is decided as a function of the power supply capacity of the generator and the battery and the temperature of the engine cooling liquid. During the operation of the electric heating apparatus, the power generating capacity of the generator is automatically increased, so that both the largest possible heating power supply and the power supply required for the automobile equipment are secured at the same time, thus providing an efficient and comfortable heating apparatus.

We claim:

1. An electric heating apparatus for an automotive vehicle including an internal combustion engine driving a power generator for charging a battery for supplying power to electrical equipment on the vehicle, and means for supplying an air-fuel mixture to the engine, comprising:

a temperature sensor for detecting a temperature of the engine;

a voltage sensor for detecting a voltage produced at a neutral terminal of the power generator rotated in synchronization with the rotational speed of the engine;

a control circuit responsive to the output signals of said temperature sensor and said voltage sensor for producing a control signal when said temperature sensor detects the temperature of the engine lower than a first predetermined value and said voltage sensor detects said voltage of the power generator higher than a second predetermined value;

rotational speed control means energized responsive to said control signal to increase the air-fuel mixture supplied to the engine;

a power supply switch energized responsive to said control signal for causing the power generator and the battery to provide power supply; and a warm air generator having an electric heating element energized by the power generator and the battery when said power supply switch is closed.

2. An apparatus according to claim 1 further comprising a heater switch of double throw momentary type which is connected to said control circuit to actuate said warm air generator when the heater switch is manually turned on.

* * * * *